Jan. 6, 1959
W. B. BRZOZOWSKI
2,867,270
VAPORIZING TYPE OIL BURNER
Filed July 18, 1955
2 Sheets-Sheet 1
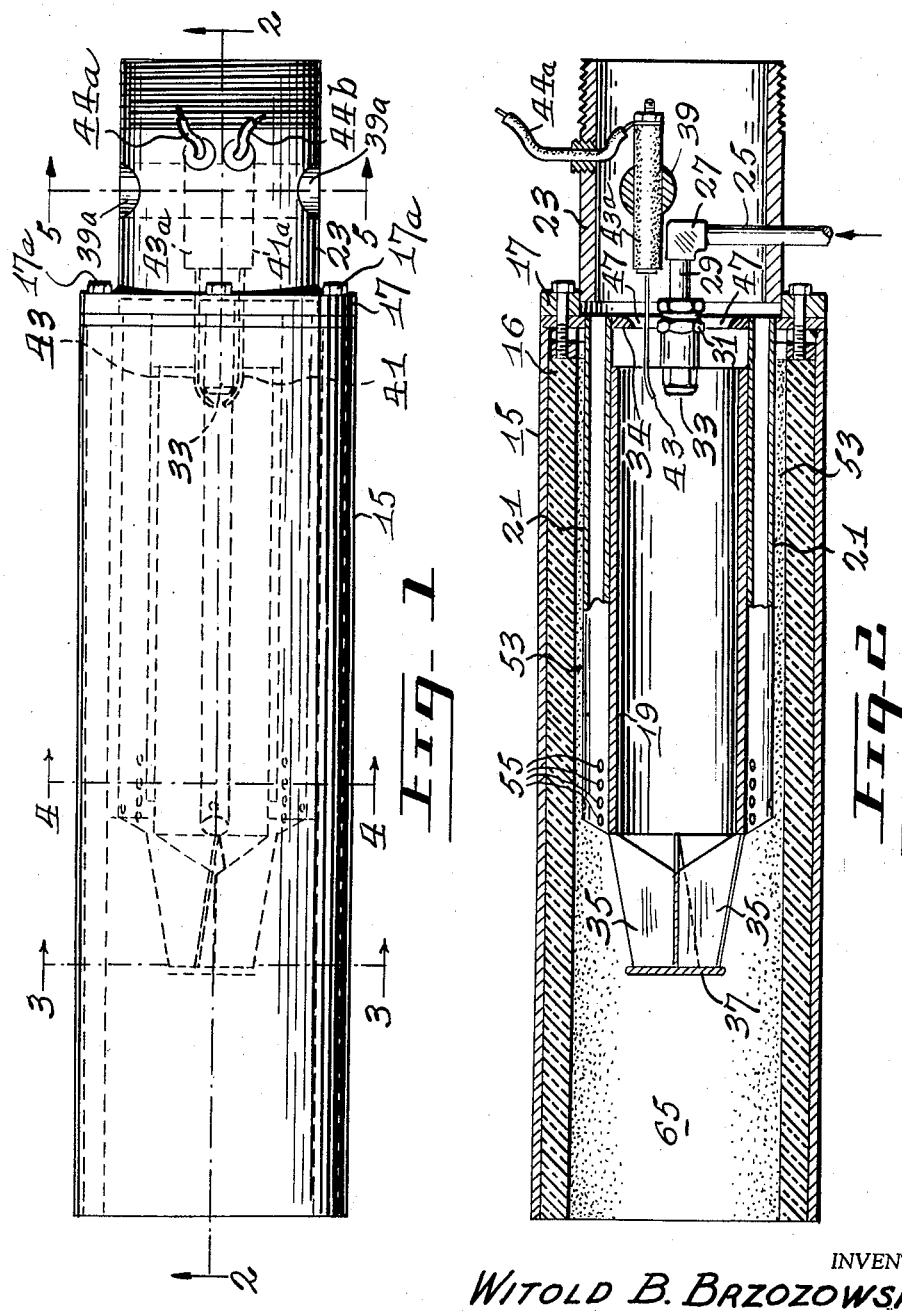
INVENTOR
WITOLD B. BRZOZOWSKI
BY *Alan Swabey*
ATTORNEY Jan. 6, 1959 W. B. BRZOZOWSKI 2,867,270
VAPORIZING TYPE OIL BURNER
Filed July 18, 1955 2 Sheets-Sheet 2

INVENTOR
WITOLD B. BRZOZOWSKI

By Alan Swabey
ATTORNEY

United States Patent Office 2,867,270
Patented Jan. 6, 1959

2,867,270

VAPORIZING TYPE OIL BURNER

Witold B. Brzozowski, Montebello, Quebec, Canada

Application July 18, 1955, Serial No. 522,701

3 Claims. (Cl. 158—76)

This invention relates to vaporizing-type oil burners.

According to the invention, there is provided the combination with air-supply means, vapor-fuel supply means and ignition means of a burner tube and a mixing tube receiving air from the supply means and so arranged that hot gases from a combustion chamber are recirculated between the mixing tube and the combustion tube to the inlet end of the mixing tube in a constant cycle. Additionally, means are provided for cooling the end of the mixing tube. This may take the form of conduits for carrying relatively cool air to the outlet end of the mixing tube.

More specifically, in accordance with the invention, an elongated, preferably cylindrical, combustion tube is provided. The inlet end of this tube carries a header. On the header is mounted a mixing tube which is also preferably cylindrical and has an inlet end, spaced from the header, to provide access from the space between the burner tube and the mixing tube to the inlet end of the mixing tube.

In one construction there are mounted on the header and preferably supporting the mixing tube a number of cooling-air tubes which extend from the header and are connected to the outer sides of the mixing tube and extend to positions near the outlet end of the mixing tube. On the header, at the side opposite the burner tube, is mounted a blast box which extends in the direction opposite to that of the burner and mixing tubes. The header is provided with a central opening which leads from the blast box to the burner tube directly in line with the inlet end of the mixing tube. The cooling-air pipes receive their air from the blast box and convey it to outlets in these pipes which are adapted to direct the air tangentially onto the end of the mixing tube which serves to cool the end of the mixing tube and so prevent its disintegration by excessive heat.

Also provided in the combination, is an atomizing nozzle which extends near the inlet end of the mixing tube and means connected with the nozzle for supplying oil under pressure. Electrode means are provided for igniting the combustion mixture.

In a preferred form of the invention, this electrode means is made up of a holder which extends cross-wise to the blast box and is held therein and a pair of electrode insulators which are held in orifices in the electrode holder and extend forward and electrodes project forwardly from the insulators to within access of the nozzle.

The mixing tube is provided at its outlet end with a number of vanes and a mixing plate. The vanes and plate are adapted to cause turbulence in the vaporized oil and air emerging from the mixing tube, causing it to be mixed.

Detailed description

Having thus generally described the invention, it will now be referred to in more detail by reference to the accompanying drawings which illustrate a preferred embodiment, and in which:

Figure 1 is a top plan view of the preferred form of burner according to the invention.

Figure 2 is a vertical cross-section along the line 2—2 of Figure 1.

Figures 3, 4:
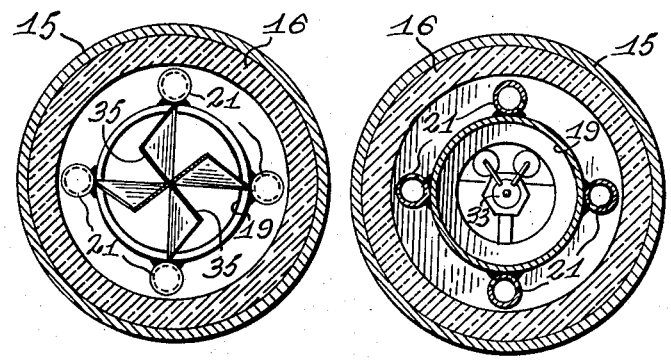
Figure 3 is a transverse cross-section along the line 3—3 of Figure 1.
Figure 4 is a transverse vertical cross-section along the line 4—4 of Figure 1.
Figure 5:
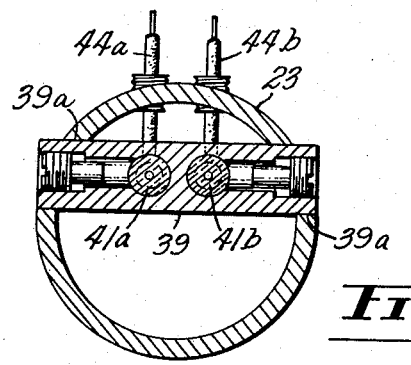
Figure 5 is a transverse vertical cross-section along the line 5—5 of Figure 1.

Referring more particularly to the drawings, the burner is made up of a main burner tube 15 which is of metal lined with a refractory lining 16.

Within the main burner tube 15 and extending from the inlet end (at the right-hand side of Figures 1 and 2) toward the outlet end is a mixing tube 19.

The tube 19 stops short in the form shown about two-thirds of the way into the burner tube.

17 is a header connected to the inlet end of the burner tube 15 as shown by bolts 17a. The header carries cooling-air pipes 21 which are connected to the sides of the mixing tube 19 about its periphery as shown. The tube 19 is supported by the pipes 21 with its inlet end spaced from the header 17 leaving a gap 34 between the inlet end of the tube 19 and the header.

The header also mounts a blast box 23 which extends in the direction opposite from the burner tube 15 and mixing tube 19.

The header is provided with a central orifice 47 which leads into the burner tube 15 at a central location so that air from the blast box 23 is directed straight into the interior of the mixing tube 19.

A nozzle arrangement made up of a pipe 25 extends upwardly through the wall of the blast box 23 to an elbow 27 to which is connected forwardly extending pipe 29 which mounts a nozzle holder 31, carrying a nozzle 33.

An electrode arrangement for ignition is mounted and constructed as follows. It has a circular housing 39 which extends across the blast box 23 as best shown in Figure 2 and the circular housing 39 is carried in openings 39a in the wall of the blast box 23.

Mounted in the housing 39 in openings 41b and 43b respectively are electrode insulators 41a and 43a respectively which carry the electrodes 41 and 43. Wiring 44a and 44b extends from the electrodes 41 and 43 to the ignition coil.

At the forward end of the vaporizing tube 19 is a mixer made up of four mixing vanes 35 and a mixing plate 37 at the end of the mixing vanes.

Operation

In operation, air comes from the blower into the blast box 23. This air passes partly through the opening or air orifice and partly into the pipes 21 surrounding the mixing tube 19.

Ignition takes place at the end of the nozzle 33 by means of the electrodes 41 and 43. The liquid fuel is vaporized within the tube 19 and mixed by the vanes 35 and the plate 37 so that combustion takes place in the portion 65 of the burner tube 15. Cool air meanwhile passes through the tubes 21 and is projected through the openings 55 on the end of the mixing tube 19, thus cooling it.

Hot gases are sucked back along the annular passage 53 formed between the refractory lining 16 and the outer face of the tube 19 and constituting a circulation chamber. These hot gases pass through the gap 34 and circulate back again into the mixing tube 19.

The hot gases in the spacial corridor 53 heat the walls of the mixing tube 19 and a portion of the atomized droplets of oil are vaporized by contact with the wall 19. This oil vapor is mixed with the air, and final mixing takes place at the mixer by the vanes 35 and the mixing plate 37 and this mixture is thrown outwards and forwards into the combustion chamber 65 where combustion takes place.

The cooling pipes 21 meanwhile convey air along the side of the mixing tube 19 to the orifices 55 and project this air tangentially onto the surface of the mixing tube 19 as shown for example in Figure 3, thus cooling the end portion of the tube to prevent it from being overheated.

As the cool air comes out of the orifices 55, it becomes mixed with the hot gases entering the space between the cooling tubes and surrounding the tube 19 and thus reduces the temperature of the recirculated portion of the gas passing through the space 53 and entering the gap 34 into the mixing tube.

*Advantages*

Advantages of this type of burner over other types of gun burners are as follows.

Very high rates of combustion can be achieved. Nearly one hundred times more B. t. u./cu. ft. of combustion space/hr. than with conventional burners.

By the same token, the combustion space in any heat exchanger equipped with this type of burner will be considerably reduced.

An inert atmosphere can be obtained if desired. The unit can burn with practically no excess air, thus producing high flame temperature.

The burner produces a sootless blue flame which is an economy factor.

The flame is short which is a great advantage where concentrated heat is required.

The burner can operate under high pressure. This in turn produces high velocity combustion products, thus increasing the heat transfer coefficient. The heating surfaces are reduced as compared with conventional burners.

I claim:

1. A vaporizing oil burner, comprising in combination, a refractory-lined main burner tube, a blast box at one end of said tube to provide blast air for combustion, a baffling member connected to and intervening said blast box and burner tube, a plurality of cooling tubes mounted on said baffling member and each having an inlet end adjacent to said blast box to receive air therefrom and an outlet end within said burner tube remote from said blast box but spaced from the opposite end of the burner tube, said cooling tubes also being spaced from the wall of said burner tube, a mixing tube supported by said cooling tubes and extending from a point spaced from said baffling member to a point near the end of said cooling tubes, said baffling member having a centrally located opening forming a passage leading from the blast box to the mixing tube, fuel atomizing means for supplying atomized liquid fuel at the inlet end of the mixing tube, the mixing tube constituting a chamber within which atomized fuel is ignited and projected forward into said combustion tube, the space between the outside of the mixing tube and the burner tube constituting with the space between the inlet end of the mixing tube and the baffling member a return passage for gases to return from the outlet end of the mixing tube to the inlet end of the mixing tube, the cooling tubes having at their outlet ends a plurality of openings leading tangentially onto the outer surface of the mixing tube whereby the end of the mixing tube is cooled by fresh air.

2. A vaporizing oil burner as defined in claim 1 including electrical means adjacent to said fuel atomizing means for igniting the atomized oil mixture.

3. A vaporizing oil burner comprising in combination a refractory-lined main burner tube having inlet and outlet ends, a mixing tube mounted in said burner tube and having an inlet end adjacent to the inlet end of the burner tube and an outlet end spaced from the outlet end of the burner tube, a header mounted on the inlet end of the burner tube and spaced from the inlet end of the mixing tube, the outside surface of the mixing tube and the inside of the burner tube and the inlet end of the mixing tube and the header forming therebetween a recirculation passage leading from the outlet end of the mixing tube to the inlet end thereof, a plurality of cooling tubes of relatively small diameter mounted on the header and spaced apart about the outer surface of the mixing tube and extending longitudinally thereof, the cooling tubes being connected to the mixing tube and forming a mounting therefor, the cooling tubes being provided with openings adjacent to the outlet end of the mixing tube, means for supplying air to the cooling tubes and mixing tube, means for providing atomized fuel at the inlet end of the mixing tube, means for igniting the fuel-air mixture, the burner and mixing and cooling tubes being so arranged to cause the air-fuel mixture ignited at the inlet end of the mixing tube to be projected through the mixing tube into the burner tube while cooling air is blown through said cooling tubes, and to draw a portion of the products of combustion back through the recirculation passage and between the inlet end of the mixing tube and the header by suction created by the forward rush of air through the mixing tube, thereby to recirculate a portion of the products of combustion into the stream of newly ignited oil-air mixture.

References Cited in the file of this patent

UNITED STATES PATENTS

| | | |
|---|---|---|
| 1,614,359 | Gaston | Jan. 11, 1927 |
| 1,718,732 | Danforth | June 25, 1929 |
| 1,975,033 | Wolff | Sept. 25, 1934 |
| 2,200,278 | Johnston | May 14, 1940 |
| 2,220,603 | Hirtz et al. | Nov. 5, 1940 |
| 2,404,647 | McCollum | July 23, 1946 |
| 2,424,765 | McCollum | July 29, 1947 |
| 2,549,347 | Van Tuyl | Apr. 17, 1951 |
| 2,587,140 | Gorshkoff | Feb. 26, 1952 |
| 2,670,032 | Vignere | Feb. 23, 1954 |
| 2,701,608 | Johnson | Feb. 8, 1955 |
| 2,716,330 | Way | Aug. 30, 1955 |